Aug. 5, 1952     M. H. SWEET     2,606,297

LIQUID LEVEL CONTROL

Filed Aug. 24, 1950

INVENTOR
MONROE H. SWEET

ATTORNEYS

UNITED STATES PATENT OFFICE 2,606,297

LIQUID LEVEL CONTROL

Monroe H. Sweet, Binghamton, N. Y., assignor to General Aniline & Film Corporation, New York, N. Y., a corporation of Delaware Application August 24, 1950, Serial No. 181,206

5 Claims. (Cl. 250—218)

This invention relates to photo-electric control devices, and more particularly to photo-electrically actuated control of the liquid supply into a container. This application is a continuation-in-part of my co-pending application Serial No. 599,012, filed June 12, 1945, now abandoned, for Liquid Level Control.

In certain industrial operations, where it is necessary to maintain adequate supply of a highly viscous liquid in a container from where the liquid is constantly withdrawn (for example in film base making), it has been found that conventional level controls are inadequate, in view of the slow conformance of such liquid to level conditions. Moreover, due to frequent replenishing of the contents, there is a tendency in the viscous material to maintain an undulating surface, and generally have a sloping level with respect to the horizontal.

It is essential that replenishing shall begin at and continue beyond a predetermined level. Photo-electric type controls operating on the specular reflection of light rays from the surface of the liquid in such cases have the drawback that the sensitivity as to a particular level is extremely critical. This is due to the comparatively narrow beam of the specularly reflected rays and large variations in the reflected angle with small changes encountered in the liquid level.

It is a particular object of this invention to provide a photo-electrically actuated valve control device for supplying highly viscous material to a container, and maintaining the liquid level therein within predetermined limits.

Another object of this invention is to provide a photo-electric device which operates over a wide angle of the reflected rays.

A particular feature of this invention is that the photo-electric system is so constructed as to exclude specular reflections of rays from the surface of the liquid in its fundamental operation, and respond principally to diffuse reflections.

Other objects and features will be apparent from the following description of the invention, pointed out in particularity in the appended claims, and taken in connection with the accompanying drawing, in which:

Figure 1:
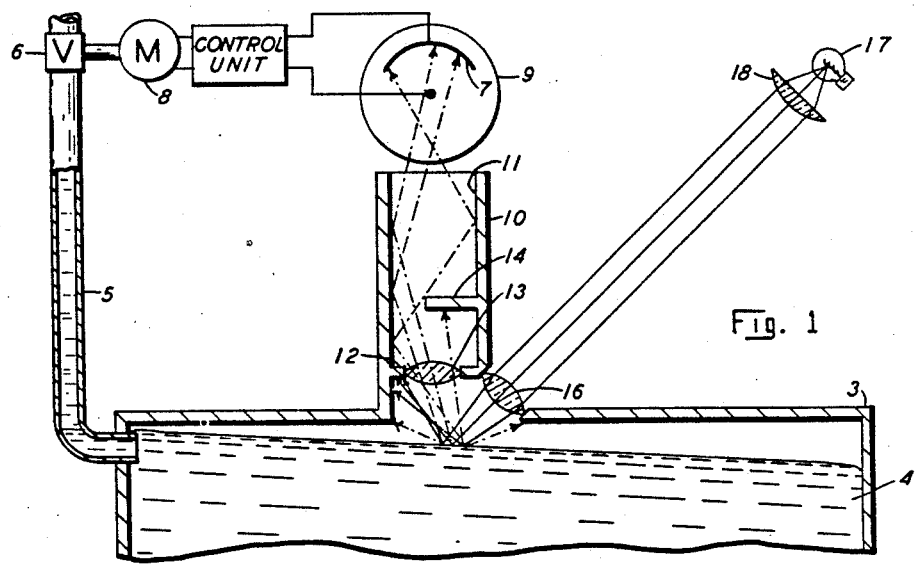
Figure 1 shows the photo-electric liquid level control in a combined schematic and diagrammatic view with the phototube energized above a certain height of the liquid.

Referring to the figures, a portion of the tank 3 is shown in cross-section, wherein a highly viscous liquid 4 is to be maintained at an average predetermined level. The liquid 4 is supplied from a suitable storage tank or any other source, not shown here, through an inlet pipe 5. A valve 6 serves to regulate the flow in the pipe 5. The regulation of the valve is effected by a suitable reversible electric motor 8. The direction of rotation of the motor 8, which in one direction closes and in another direction opens the valve 6, is determined by a control unit shown in block diagram. This unit responds to current flow in the phototube 9.

The valve 6, motor 8, and control unit for the phototube 9 are not shown in detail, for these have no direct bearing on the invention and represent any suitable type of standard components chosen in accordance with design requirements. The control unit, for example, may include simple amplifier and relay circuits of the type described in "Theory and Applications of Electron Tubes" by H. J. Reich, 1939 edition, on pages 505 and 506, or more elaborate circuits depending upon the phototube used and power requirements of the motor.

The tank 3 is provided with an optical system comprising a tubular light guide 10 extending vertically. The latter has a polished light reflecting inner surface 11, and a bottom wall 12 supporting a lens 13. Transverse to the axis of the guide 10, and above the lens 13, is placed a light obstructing baffle 14 in the form of a segment-shaped disk extending laterally from the wall 11. The purpose of this baffle will be more fully explained in connection with the operation of the device. At the foot of the guide 10 and tilted at approximately 45° angle is held a lens 16.

The entire assembly of the optical system just described is schematically shown for simplicity of illustration. It is to be understood that the guide 10, lenses 13 and 16 form a unitary structure which may be equipped with any suitable mounting such as a threaded flange or bushing for installation in various types of tanks.

The phototube 9, or an equivalent light responsive element, is placed in optical alignment with the light guide 10 and a light source 17 is arranged, in combination with a condensing lens 18, in proper position to throw a beam of light onto the lens 16. This beam is at approximately a 45° angle with respect to the top of the tank 3.

The lens 16 collimates the beam and converges the light at a point along a line extending downwardly from the axis of the light guide 10.

It should be observed here that the light guide 10, being at an angle of 90° with respect to the top of the tank 3, excludes the specular component of the rays reflected from the liquid surface at normal levels of operation. The specular rays are shown in solid lines, and their angle of reflectance, being equal to the angle of incidence of the beam from the source 17, is at 45° with respect to the surface of incidence. In accordance with the invention, the light guide 10 is so dimensioned that no rays reflected directly from the liquid surface may reach the phototube 9. All effective rays impinging on the phototube 9 reach its cathode 7 by way of one or several reflections over the polished surface of the wall 11. The specular component is utilized predominantly in these reflections, inasmuch as the polished surface reduces the diffuse reflection to a negligible amount, far below that of the sensitivity of the phototube 9. On the other hand, the liquid level determining reflections directed toward the lens 13 are those which result from diffuse reflection. It becomes evident that, since diffuse reflection results in light rays reflected from the surface in all directions, there appears a luminous spot of a relatively large area which moves past the light admitting aperture of the light guide, namely the lens 13, in accordance with the change in the level of the liquid.

Figure 2:
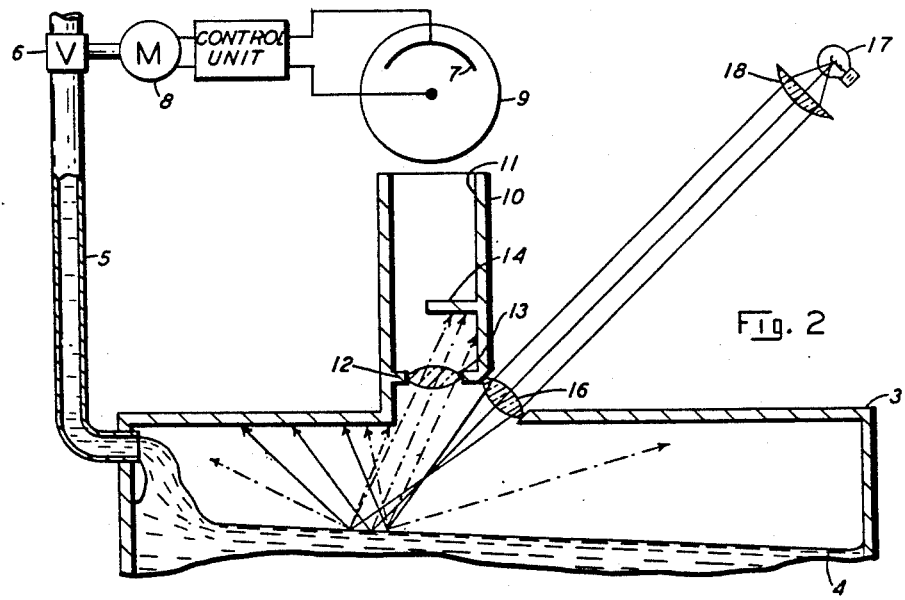
Figure 2 is a similar view showing the phototube de-energized at a liquid level below a certain height. Identical reference characters in the two figures denote similar components.

The operation of the control device may easily be followed in comparing Figure 1, which shows a high liquid level, with Figure 2, which shows a low level. The liquid feed is so arranged that the motor 8 is constantly energized to rotate in a direction for opening the valve 6. In this mode of operation, the motor employed is of the torque type which, when reaching the limit of travel, remains energized and holds the valve 6 open. The reversal of the motor, produced by the control unit, closes the valve 6 and holds it closed as long as the motor remains energized in this direction, which is dependent on the conductivity of the phototube 9.

Now it will be seen that the rays of the light source 17, converged by the lens 16 on the surface of the liquid and diffusely reflected in all directions, will at and above a certain level of the liquid find a path within the guide 10 where, by reflections from the wall 11, they are conducted to the cathode 7 of the phototube 9. The control unit thus becomes operative and reverses the motor 8, and the valve 6, which heretofore was open, will be closed, shutting off the supply to the tank 3. As liquid is withdrawn from the tank, the level recedes and a point is reached where the direction of diffusely reflected rays is such that these no longer find a path within the light guide 10 (Figure 2), inasmuch as the rays which enter the lens 13 will be obstructed by the baffle 14. The function of the latter is to impede passage of the rays arriving at and beyond a predetermined angle, whereby conduction through the light guide 10 is restricted over a pretdermined path.

Figure 3:
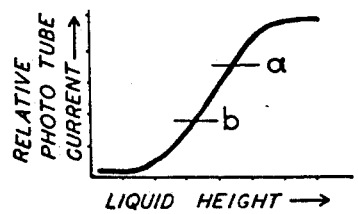
Figure 3 is a curve which shows the relation of the relative phototube current to the height of the liquid.

The level control, obtained in this manner, permits smooth operation with a great deal of latitude in variation of the level or in the configuration of the liquid mass. There is no sharp point where variations above or below a certain level would cause hunting of the valve motor 8. It should be noted that the control in either direction, where the the liquid rises or falls, remains active within desired limits. It is seen in Figure 3 that the change in height of the liquid mass results in a change in the light intensity reaching the phototube 9, with a corresponding change in the output current thereof. This change is gradual, and the slope of the current curve in the linear portion thereof represents the useful range of operation. Desired limits can be chosen within maximum and minimum current conditions along this straight portion of the response curve for directional reversals of the valve motor 8. This can be effected by proper choice of the phototube control unit or by the response characteristics of the phototube itself.

As an example, with response points chosen between $a$ and $b$, when the liquid mass reaches the height which results in such light intensity as to produce the current magnitude represented by $a$, the motor 8 is reversed to close the valve 6. As the liquid mass is withdrawn and the level is lowered, the light intensity in the guide 10 gradually diminishes, since more and more of the diffusely reflected rays impinge on the obstructing baffle 14. According, the phototube current decreases until the magnitude represented by $b$ is reached, when the motor 8 is again reversed to open the valve 6.

With highly viscous liquids, such slow and steady operation is desirable. Often, the liquid as it is fed undulates due to its mass, and such undulations may produce wave fronts which would appear as higher level conditions than the average. This will not affect the control system, in view of the fact that in either direction, operation is maintained within desired limits over low or high level conditions.

I claim:

1. In a photo-electrically actuated device for controlling the liquid supply to a container, a photosensitive element from which control of liquid flow to the container is initiated, a light source, means for converging rays from said source upon the liquid surface in said container, a tubular light guide means positioned for excluding specular reflections of said rays from said surface from reaching said element, and for conducting diffuse reflections of said rays from said surface onto said element, and light obstructing means in said guide means for restricting said conduction over a predetermined path, the effective conduction in said path being determined by the liquid level.

2. In a photo-electrically actuated device for controlling the liquid supply to a container, a photosensitive element from which control of liquid flow to the container is initiated, a light source, means for converging rays from said source upon the liquid surface in said container, a tubular light guide positioned for excluding specular reflections of said rays from said surface from reaching said element, said guide having an internal reflecting wall for conducting diffuse reflections of said rays from said surface onto said element, and a light obstructing baffle in said guide restricting said conduction over a predetermined path, the effective conduction in said path being determined by the liquid level.

3. In a photo-electrically actuated device for controlling the liquid supply to a container, a photosensitive element from which control of liquid flow to the container is initiated, a light source and a closed optical system so positioned that only diffusely reflected light of said source from the liquid surface energizes said photosensitive element in accordance with the liquid level in the container, said optical system including a lens by which rays of light from the said source are concentrated on the surface of the liquid, a tubular light guide in alignment with the photosensitive element and having an internal reflecting surface from which said photosensitive element receives light by reflections in one path alongside said surface, a lens adjacent the lower end of said guide for receiving rays of light reflected from the liquid surface and a baffle within said guide between said last-mentioned lens and the photosensitive element for obstructing the reflections of rays in another path from said internal surface due to altered conditions of liquid level.

4. In a photo-electrically actuated device for controlling the liquid supply to a container, a photosensitive element from which control of liquid flow to the container is initiated, a light source and a closed optical system so positioned that only diffusely reflected light of said source from the liquid surface energizes said photosensitive element in accordance with the liquid level in the container, said optical system including a lens for collimating rays from the source, another lens for receiving said collimated rays and concentrating them on the surface of the liquid, a tubular light guide in alignment with the photosensitive element and having adjacent its lower end a lens positioned to receive the rays of light reflected from the surface of the liquid and to guide said rays by reflection from the wall thereof in one path along the length of said guide, a baffle within the tube and between said last-mentioned lens and the photosensitive element positioned at one side of and transversely of the guide and comprising a segment shaped, partial disk closing off one side of the tube to obstruct the reflections of rays in another path from said wall thereby preventing said reflected light from reaching the photosensitive element, except when reflected from liquid levels of predetermined heights.

5. In a photo-electrically actuated device for controlling the liquid supply to a container, a photosensitive element from which control of liquid flow to the container is initiated, a light source and a closed optical system so positioned that only diffusely reflected light of said source from the liquid surface energizes said photosensitive element in accordance with the liquid level in the container, said optical system including light collimating means for projecting rays from said source at an angle of substantially 45° to the surface of the liquid, a lens adjacent the surface of the liquid for receiving and concentrating the rays onto said liquid surface, a metal tube positioned at an angle of substantially 90° to the surface of the liquid and having an internal reflecting surface projecting upwardly from the surface of the liquid in alignment with said photosensitive element, a lens in said tube adjacent its lower end for directing the rays reflected from the liquid surface upon the internal reflecting surface of said tube, said rays reaching the photosensitive element by reflections in one path, a light obstructing baffle comprising a transverse, opaque segment-shaped constriction at one side of the bore of the tube positioned to prevent rays reflected from the liquid surface reaching the photosensitive element in another path, whereby rays reaching said element are effective beyond a certain level of said liquid.

MONROE H. SWEET.

REFERENCES CITED

The following references are of record in the file of this patent:

UNITED STATES PATENTS

| Number | Name | Date |
|---|---|---|
| 2,081,134 | Buckley | May 25, 1937 |
| 2,345,445 | Atwood | Mar. 28, 1944 |
| 2,466,696 | Friswold et al. | Apr. 12, 1949 |